E. Reichard,
Cage Trap,

No. 83,094. Patented Oct. 13, 1868.

Witnesses
George P. Herthel Jr.
Robert Burns.

Inventor.
Edward Reichard

United States Patent Office.

EDWARD REICHARD, OF WASHINGTON, MISSOURI.

Letters Patent No. 83,094, dated October 13, 1868.

IMPROVED ANIMAL-TRAP.

The Schedule referred to in these Letters Patent and making part of the same.

*To all whom it may concern:*

Be it known that I, EDWARD REICHARD, of Washington, in the county of Franklin, and State of Missouri, have made certain new and useful Improvements in Animal-Traps; and I do hereby declare that the following is a full and clear description therof, reference being had to the accompanying drawings, and to the letters of reference marked thereon.

The nature of this invention is in the formation of an animal-trap out of spherical lobes, which open to permit entry of the animal to the bait, and thereupon close, when the bait is attacked, and encircle the animal, to confine the same, without injury to the animal; and said nature is in certain detail devices, hereinafter more fully described.

Figure 1:
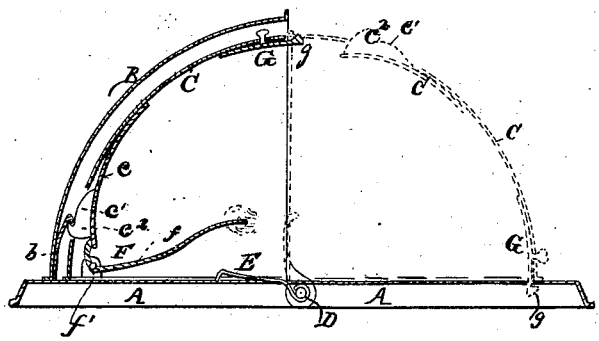
Figure 2:
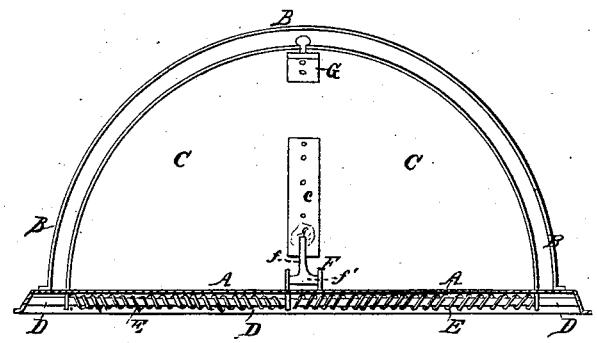

To enable those skilled herein to make and use my said trap, I will describe the same in its construction and operation, referring to the accompanying Figure 1 as a transverse sectional elevation, and to Figure 2 as a longitudinal sectional elevation, showing the trap open.

I construct my said trap of a base-piece, A, usually circular in form, of wood, or cast or wrought-iron plate.

On said base I secure the spherical lobe B, which forms the rear enclosing part of the trap. Said lobe B may have air-openings, and be otherwise latticed or punctured for air or ventilation-holes. I arrange the hinged lobe C, also of spherical form, so that it may fold within or turn within the fixed lobe B when the trap is open, as indicated in fig. 2.

The hinged lobe C is attached to the journal D, usually placed beneath the base-plate A, and fixed thereto. A strong spring, E, either of a spiral form, wrapped around the journal D, or straight, and secured to said journal, will be so connected with the lobe C, that its force will be exerted in urging the lobe C to its "shut-down" position, as indicated by the dotted lines in fig. 1.

On said lobe C, I arrange the plate-spring $c$. This has a tappet-cam, $c^1$, with a kerf or indentation, $c^2$, near its upper edge. Near the base of the fixed lobe B, (in the vertical line of traverse of the cam $c^1$) I arrange the spring $b$, having a curved end arranged to engage and retain the cam $c^1$, by passing into the kerf $c^2$, when the lobe C is moved back with the lobe B, as indicated in full lines in fig. 1.

The trip or motive-device F is arranged to operate the release of the cam $c^1$ from the spring $b$ in the manner following:

To the base-plate A is secured the trip-lever $f$, which moves freely on its journal $f'$. The forward end of the trip-lever $f$ is arranged to receive the bait, which will be vegetable or animal food, to suit the taste of the animal to be caught.

The rear end of said lever, $f$, (when the lobe C is opened,) touches the projecting edge of the plate-spring $c$, and when, by action of the animal, the bait is moved, and thus the lever $f$ is tipped or tripped, the spring $c$ is forced downward and forward, thus releasing the cam $c$ from its detent-spring $b$, and then, by action of the spring E, the movable lobe C is forced quickly forward to meet the base, A, and thus environ and retain the baited animal.

In order, however, that the lobe C may not be raised against the pressure of the spring E, I arrange the spring-catch G, the detent $g$ whereof, passing under the base-plate, A, prevents the lifting of the lobe C. A button on the spring-catch G enables the operator to force back the spring and its detent $g$, so that the lobe C may be raised, to secure the captured animal, and reset the trap.

The action of the said parts is in the manner following: The operator, by pressing back the button on the catch G, and raising then the lobe C, turns the said lobe C back within the lobe B, against the pressure of the spring E. When the lobe C is moved back far enough, the spring $b$ retains said lobe by engaging the cam $c^1$. If, then, the lobe C is held, the lever $f$ may be baited, and the trap is "set."

The action of the animal is to withdraw the bait from said lever $f$, and thus to release the spring $b$ from the cam $c^1$, whereupon the spring E forces forward the lobe C, and the animal is caught, the catch G acting to prevent the lobe C from being lifted.

It will be seen that the said parts are simple in construction, and easily refitted, when worn by long use, and owing to unobstructed entrance to the cavity under the opened lobe C, as shown in fig. 1 in full lines, the animal is in nowise deterred from entering, and as the head of the animal is toward the bait, the lobe C, in shutting down, will pass quickly behind the animal, before the same can turn to escape; the action of my said trap being herein expeditious, and certain of desired effect.

Having thus fully described my invention,

What I claim, is—

1. The trap, formed of the base, A, the fixed lobe B, journal D, spring E, and movable lobe C, substantially as and for the purposes set forth.

2. The combination of the trip-lever $f$, the spring $c$, its cam $c^1$ and detent-spring $b$, substantially as and for the purposes set forth.

3. The spring-catch G, in combination with the lobe C, when arranged to secure said lobe to the base-plate, A, by the detent $g$, substantially as set forth.

EDWARD REICHARD.

Witnesses:
GEO. P. HERTHEL, Jr.,
ROBERT BURNS.